(12) United States Patent
Law

(10) Patent No.: US 7,103,892 B2
(45) Date of Patent: Sep. 5, 2006

(54) SCREWLESS OPTICAL DISC DRIVE HOUSING

(75) Inventor: Peng-Khian Law, Penang (MY)

(73) Assignee: BenQ Corporation, Tao-Yuan Hsien (TW)

( * ) Notice: Subject to any disclaimer, the term of this patent is extended or adjusted under 35 U.S.C. 154(b) by 525 days.

(21) Appl. No.: 10/605,893

(22) Filed: Nov. 4, 2003

(65) Prior Publication Data
US 2004/0210915 A1  Oct. 21, 2004

(30) Foreign Application Priority Data
Apr. 21, 2003  (MY) .............. PI 20031484

(51) Int. Cl.
G11B 33/02  (2006.01)
(52) U.S. Cl. .................... 720/600; 361/685
(58) Field of Classification Search ........... 720/600; 361/685, 727
See application file for complete search history.

(56) References Cited
U.S. PATENT DOCUMENTS
5,734,557 A * 3/1998 McAnally et al. .......... 361/727
5,921,644 A * 7/1999 Brunel et al. ............. 312/223.2
6,370,022 B1 * 4/2002 Hooper et al. ............. 361/685
6,654,240 B1 * 11/2003 Tseng et al. ............... 361/685

* cited by examiner

Primary Examiner—Angel Castro
(74) Attorney, Agent, or Firm—Winston Hsu

(57) ABSTRACT

An optical disc drive contains a lower housing, a loader disposed on the lower housing, and an upper housing disposed on the lower housing for enclosing the loader between the upper housing and the lower housing. The lower housing contains a plurality of lower guiding flaps for guiding the lower housing into proper position during assembly and a plurality of openings formed in the lower housing. The loader contains a plurality of guiding holes for receiving the corresponding lower guiding flaps as the loader is disposed on the lower housing. The upper housing contains a plurality of upper guiding flaps formed for insertion into the corresponding guiding holes of the loader for guiding the upper housing into proper position during assembly and a plurality of hooks formed for insertion into the corresponding openings of the lower housing for securing the upper housing to the lower housing.

20 Claims, 11 Drawing Sheets

SCREWLESS OPTICAL DISC DRIVE HOUSING

BACKGROUND OF INVENTION

1. Field of the Invention

The present invention relates to the housing of an optical disc drive, and more specifically, to an optical disc drive housing that can be assembled without the use of screws.

2. Description of the Prior Art

During the assembly of an electrical device, it is common to secure a housing of the device with screws. Screws and screwdrivers are universal parts, allowing the housing to be assembled or disassembled anywhere.

Please refer to FIG. 1 and FIG. 2. FIG. 1 is an exploded view of an optical disc drive 10 according to the prior art. FIG. 2 is a bottom view of the optical disc drive 10 after assembly. The optical disc drive 10 comprises an upper housing 12, a loader 14 for loading an optical disc, and a lower housing 16. When assembling the optical disc drive 10, the loader 14 is placed on the lower housing 16 and the upper housing 12 is then placed over the lower housing 16 to enclose the loader 14 between the upper housing 12 and the lower housing 16. A plurality of screws 24 is then used to secure the lower housing 16 to the upper housing 12. The screws 24 are inserted through openings 22 in the lower housing 16. Next, the screws 24 are fed through holes 20 in the loader 14, and screwed into receptacles 18 located in the upper housing 12.

Unfortunately, the use of screws 24 to secure the lower housing 16 to the upper housing 12 has many disadvantages. First of all, time is needed for inserting or removing the screws 24 whenever the optical disc drive 10 is assembled or disassembled, respectively. Since assembly personnel are required for assembling the optical disc drive 10, the more time and effort required to assemble the optical disc drive 10, the higher the cost will be.

SUMMARY OF INVENTION

It is therefore a primary objective of the claimed invention to provide an optical disc drive containing a housing that can be assembled without the use of screws in order to solve the above-mentioned problems.

According to the claimed invention, an optical disc drive contains a lower housing, a loader disposed on the lower housing, and an upper housing disposed on the lower housing for enclosing the loader between the upper housing and the lower housing. The lower housing contains a plurality of lower guiding flaps for guiding the lower housing into proper position during assembly and a plurality of openings formed in the lower housing. The loader contains a plurality of guiding holes for receiving the corresponding lower guiding flaps as the loader is disposed on the lower housing. The upper housing contains a plurality of upper guiding flaps formed for insertion into the corresponding guiding holes of the loader for guiding the upper housing into proper position during assembly and a plurality of hooks formed for insertion into the corresponding openings of the lower housing for securing the upper housing to the lower housing.

It is an advantage of the claimed invention that the upper and lower housings can be secured to each other without the use of screws for reducing the time and cost required for assembly and disassembly.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
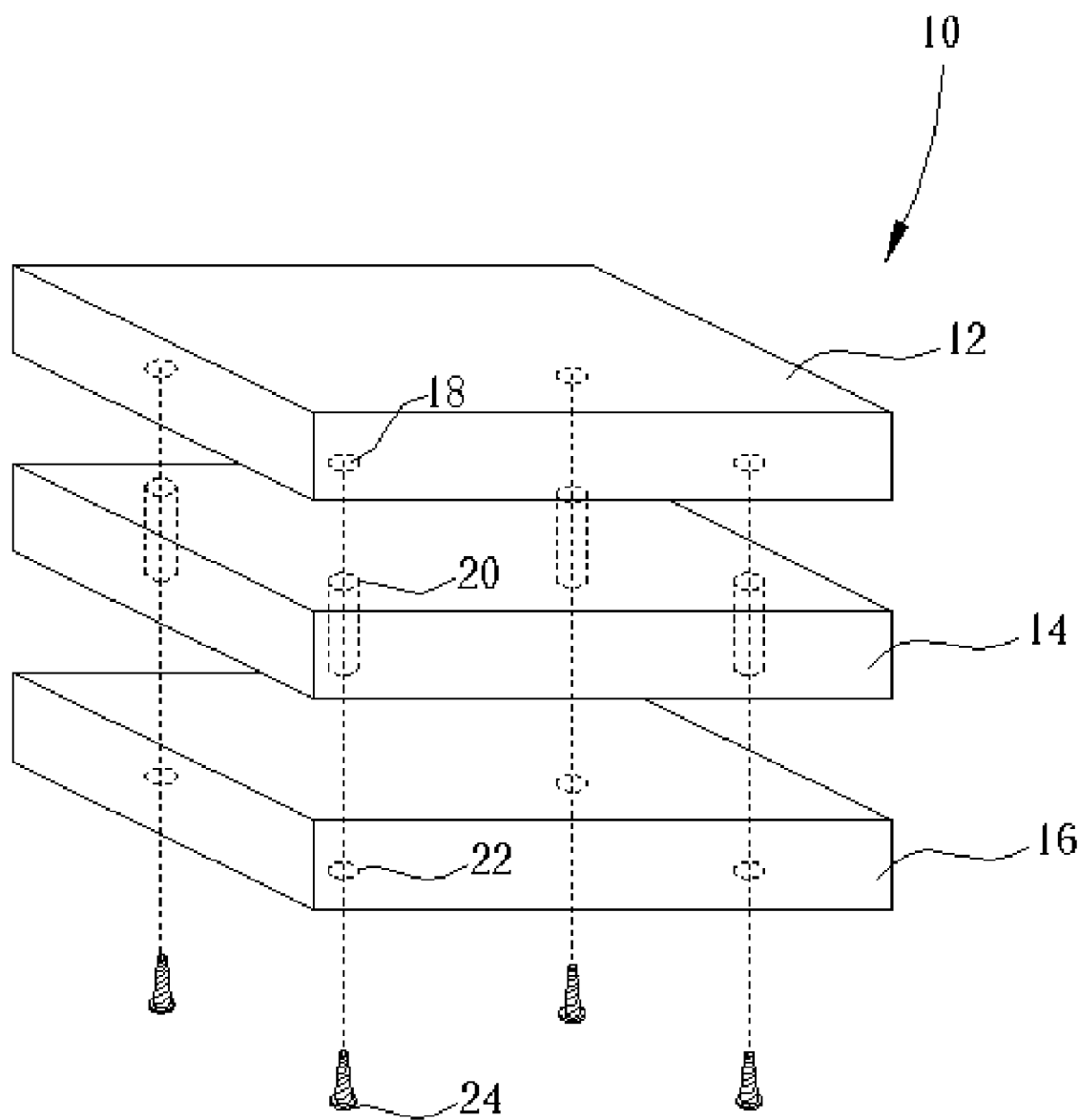
FIG. 1 is an exploded view of an optical disc drive according to the prior art.
Figure 2:
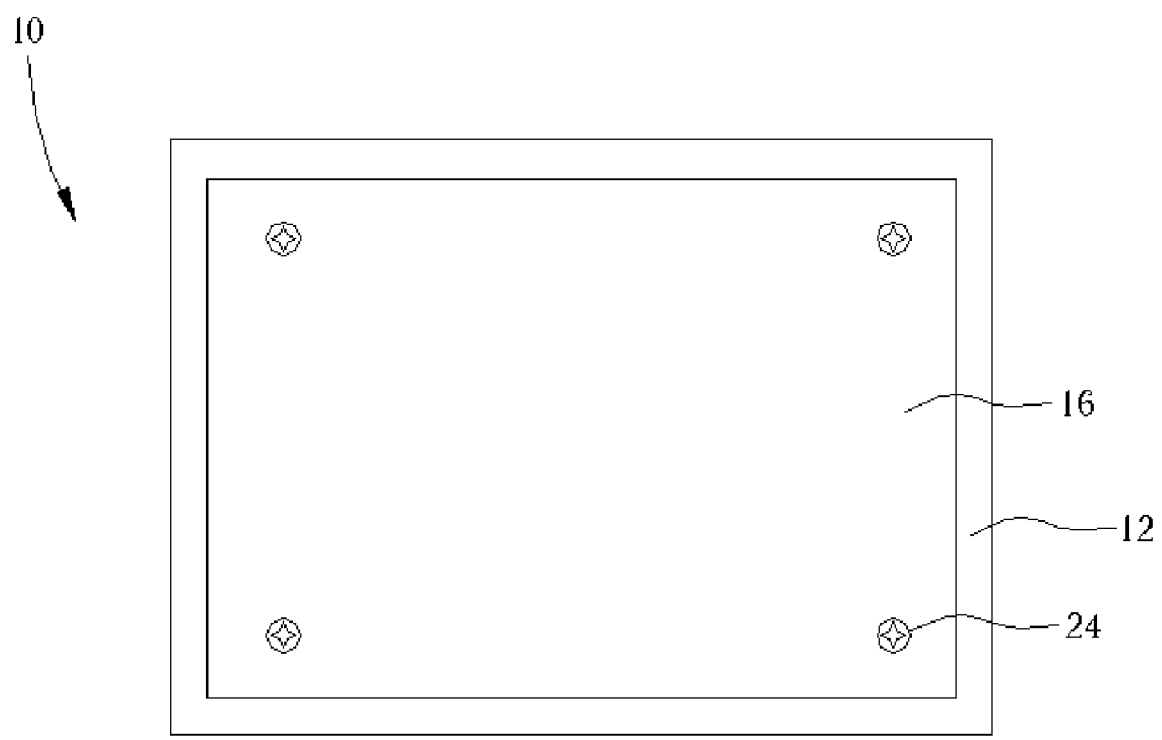
FIG. 2 is a bottom view of the optical disc drive after assembly.
Figure 3:
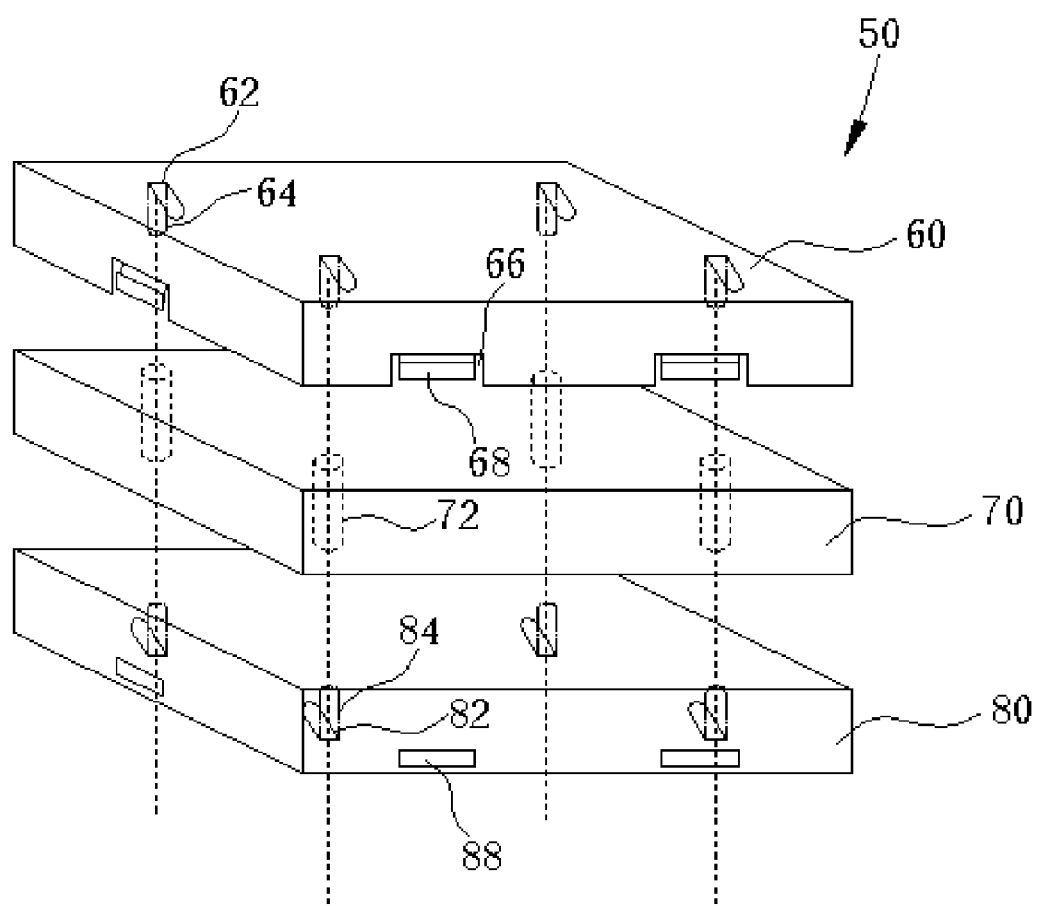
FIG. 3 is an exploded view of an optical disc drive according to a preferred embodiment of the present invention.

Please refer to FIG. 3. FIG. 3 is an exploded view of an optical disc drive 50 according to a preferred embodiment of the present invention. The optical disc drive 50 contains an upper housing 60, a loader 70 for loading an optical disc, and a lower housing 80. When assembling the optical disc drive 50, the loader 70 is placed on the lower housing 80 and the upper housing 60 is then placed over the lower housing 80 to enclose the loader 70 between the upper housing 60 and the lower housing 80.

Figure 4:
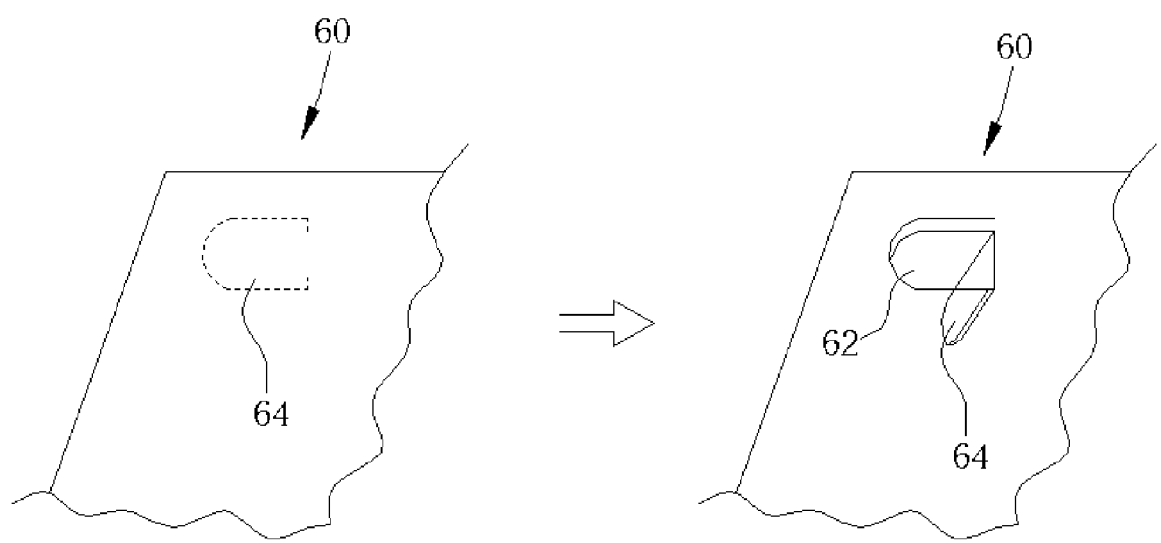
FIG. 4 is a diagram of an upper guiding flap that is monolithically formed with an upper housing.

Please refer to FIG. 4. FIG. 4 is a diagram of an upper guiding flap 64 that is monolithically formed with the upper housing 60 by cutting the upper guiding flap 64 out of the upper housing 60 and folding the upper guiding flap 64 inward, leaving an exposed hole 62 in its place.

Please refer back to FIG. 3. Not only does the upper housing 60 contain a plurality of upper guiding flaps 64, but the lower housing 80 also contains a plurality of lower guiding flaps 84 with corresponding holes 82. When the loader 70 is placed onto the lower housing 80, the lower guiding flaps 84 of the lower housing 80 are inserted into corresponding guiding holes 72 on the loader 70 for guiding the loader 70 into a proper position with respect to the lower housing 80. Likewise, when the upper housing 60 is placed on the lower housing 80, the upper guiding flaps 64 of the upper housing 60 are inserted into the corresponding guiding holes 72 of the loader 70 for guiding the upper housing 60 into a proper position with respect to both the loader 70 and the lower housing 80.

Instead of using screws to secure the lower housing 80 to the upper housing 60, the present invention optical disc drive 50 uses a plurality of hooks 68 formed on side surfaces of the upper housing 60 to insert into a plurality of openings 88 formed in side surfaces of the lower housing 80. The upper housing 60 contains a plurality of side holes 66, which prevent the upper housing 60 from covering the openings 88 of the lower housing 80, thereby allowing the hooks 68 to insert into the openings 88.

The assembly of the optical disc drive 50 of the present invention can be summarized in three steps. First, the loader 70 is placed on the lower housing 80, with the lower guiding flaps 84 being inserted into the guiding holes 72 of the loader 70. Next, the upper guiding flaps 64 of the upper housing 60 are inserted into the guiding holes 72 of the loader 70. One of the lower guiding flaps 84 and one of the upper guiding flaps 64 are preferably inserted into a same guiding hole 72 of the loader 70. Finally, the hooks 68 of the upper housing 60 are inserted into the openings 88 of the lower housing 80, latching the upper housing 60 to the lower housing 80.

Figure 5:
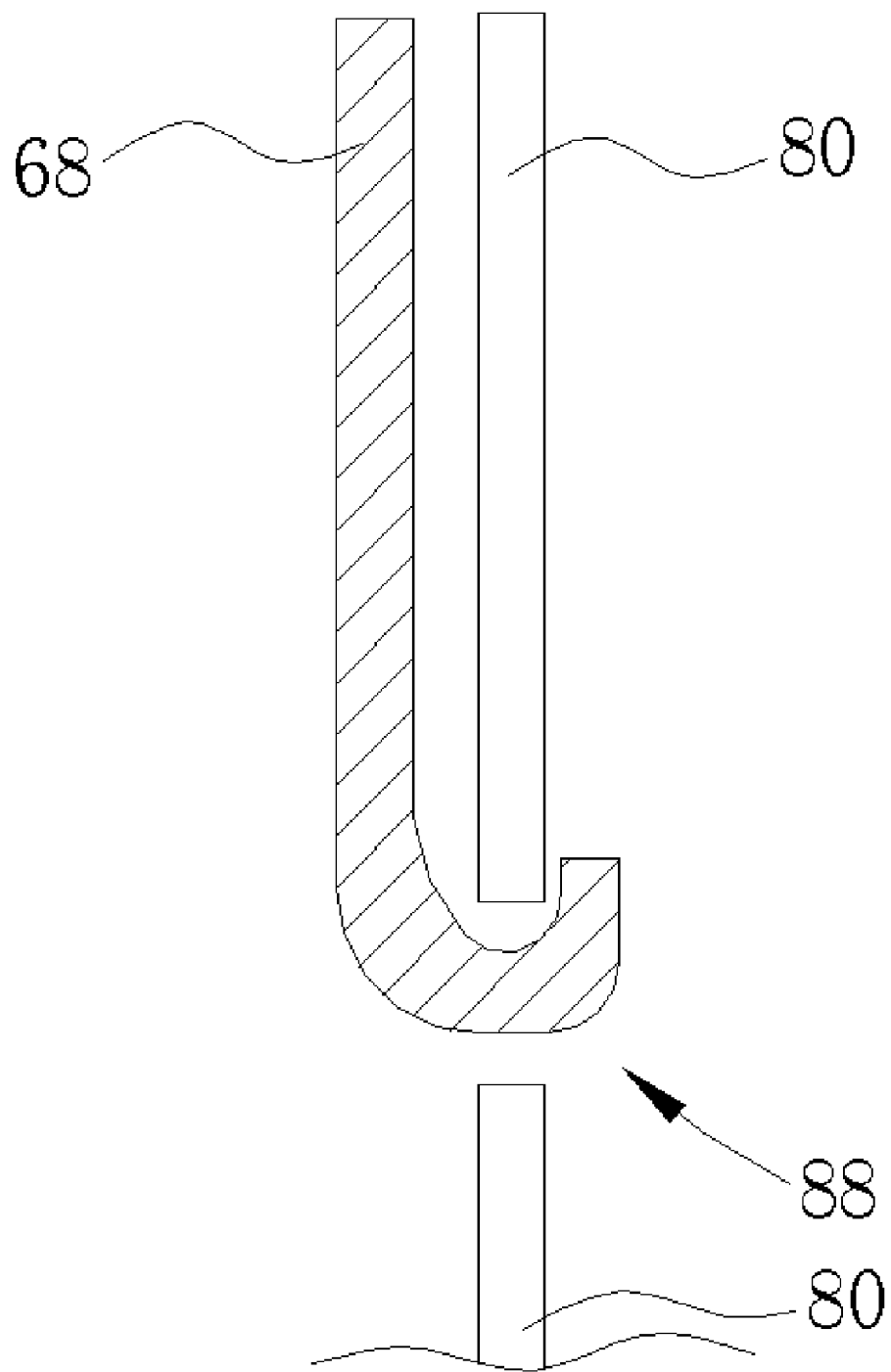
FIG. 5 shows a cross-sectional view of the optical disc drive showing a hook being inserted into an opening of a lower housing.
Figure 6:
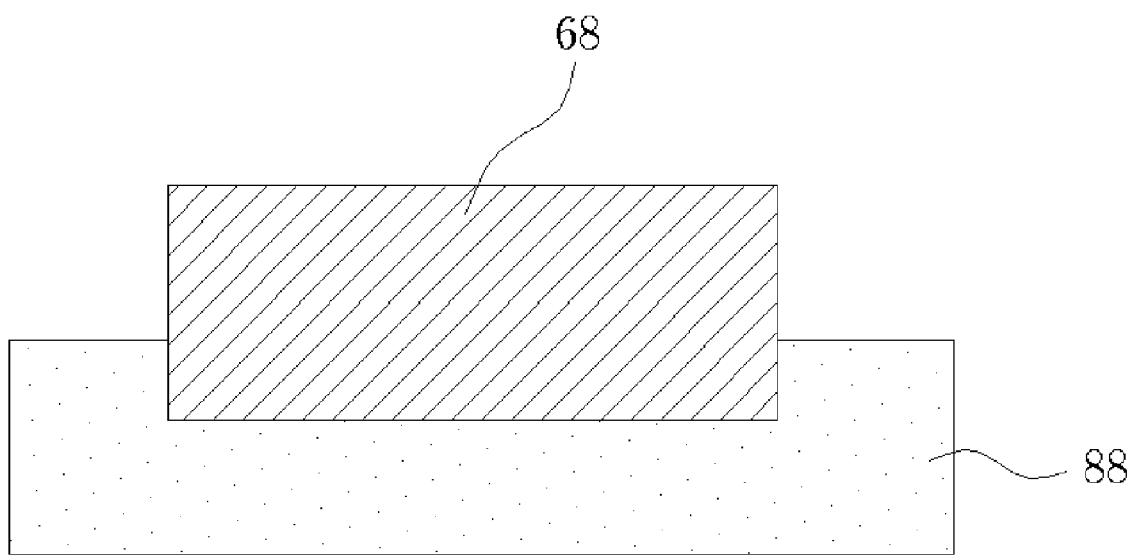
FIG. 6 shows a side view of the hook after insertion into the opening.

Please refer to FIG. 5 and FIG. 6. FIG. 5 shows a cross-sectional view of the optical disc drive 50 showing one of the hooks 68 being inserted into one of the openings 88 of the lower housing 80. Notice that the hook 68 has a J-shape, and the lower, curved part of the hook 68 is inserted into the opening 88. FIG. 6 shows a side view of the hook 68 after insertion into the opening 88. The opening 88 is preferably rectangular in shape, although other shapes are possible. Likewise, it should be noted that the hooks 68 could have other shapes besides a J-shape, so long as the hooks 68 are capable of latching with the openings 88 of the lower housing 80.

Figure 7:
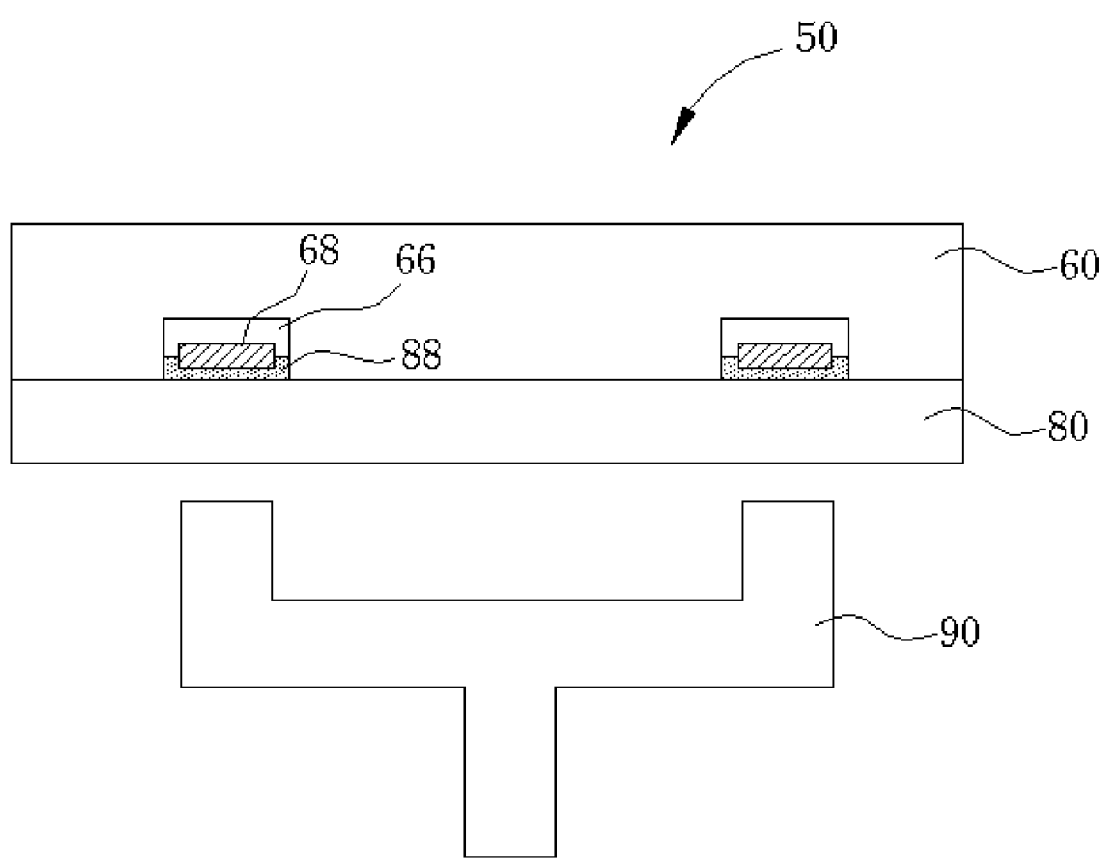
FIG. 7 shows a Y-shaped tool used for releasing the hooks from the openings.

Please refer to FIG. 7. FIG. 7 shows a Y-shaped tool 90 used for releasing the hooks 68 from the openings 88. The Y-shaped tool 90 shown in FIG. 7 is used as an example to show how two hooks 68 could be released from the corresponding openings 88 simultaneously. The Y-shaped tool 90 releases the hooks 68 from the openings 88 by pushing the hooks 68 towards the openings 88 in a direction that is roughly perpendicular to the side surface of the lower housing 80. In this example, it is assumed that the two hooks 68 and openings 88 are located on a same side of the optical disc drive 50. Of course, other tools could be used for releasing different numbers of hooks 68 simultaneously. In addition, it is also possible to release one hook 68 at a time.

Figure 8:
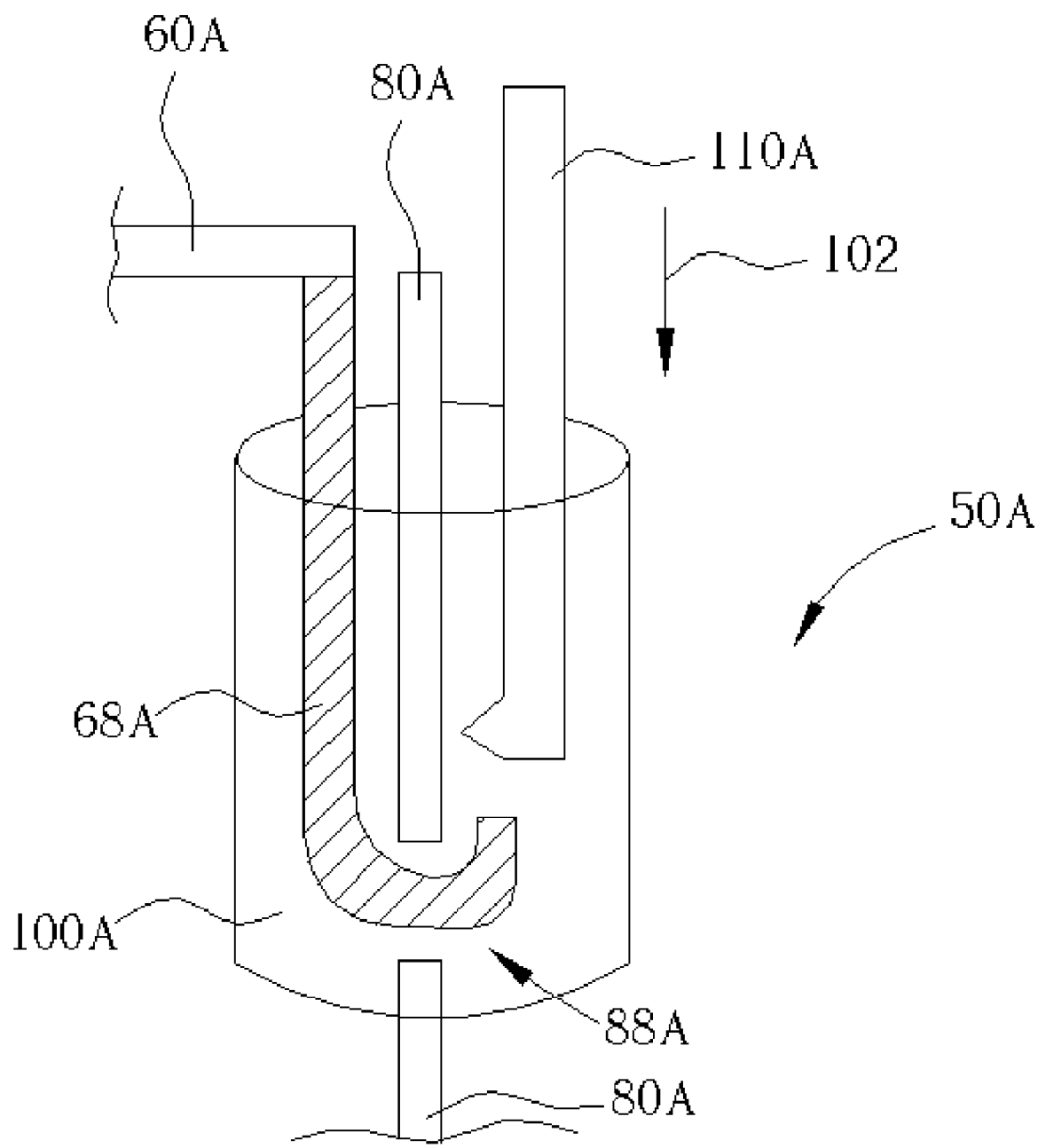
FIG. 8 is a partial view of a second embodiment optical disc drive.

Please refer to FIG. 8. FIG. 8 is a partial view of a second embodiment optical disc drive 50A. The second embodiment optical disc drive 50A is similar to the preferred embodiment optical disc drive 50. The only difference is the position of hooks 68A of an upper housing 60A and openings 88A of a lower housing 80A. In the optical disc drive 50A, the openings 88A are formed above a bottom surface of the lower housing 80A and the hooks 68A are formed below a top surface of the upper housing 60A. Tunneling holes 100A are formed in the loader through which the hooks 68A latch with the corresponding openings 88A in the lower housing 80A. Thus, unlike the optical disc drive 50 shown in FIG. 3 in which the openings 88 and the hooks 68 were disposed on the side surfaces of the lower housing 80 and the upper housing 60 respectively, the hooks 68A and openings 88A of the optical disc drive 50A may be formed in the middle of the optical disc drive 50A, and are not limited to side surfaces. For releasing the hooks 68A from the openings 88A, sticks 110A may be inserted into the tunneling holes 100A. The sticks 110A push the hooks 68A in a downward direction 102 so that the hooks 68A are pushed back through the openings 88A for releasing the hooks 68A.

Figure 9:
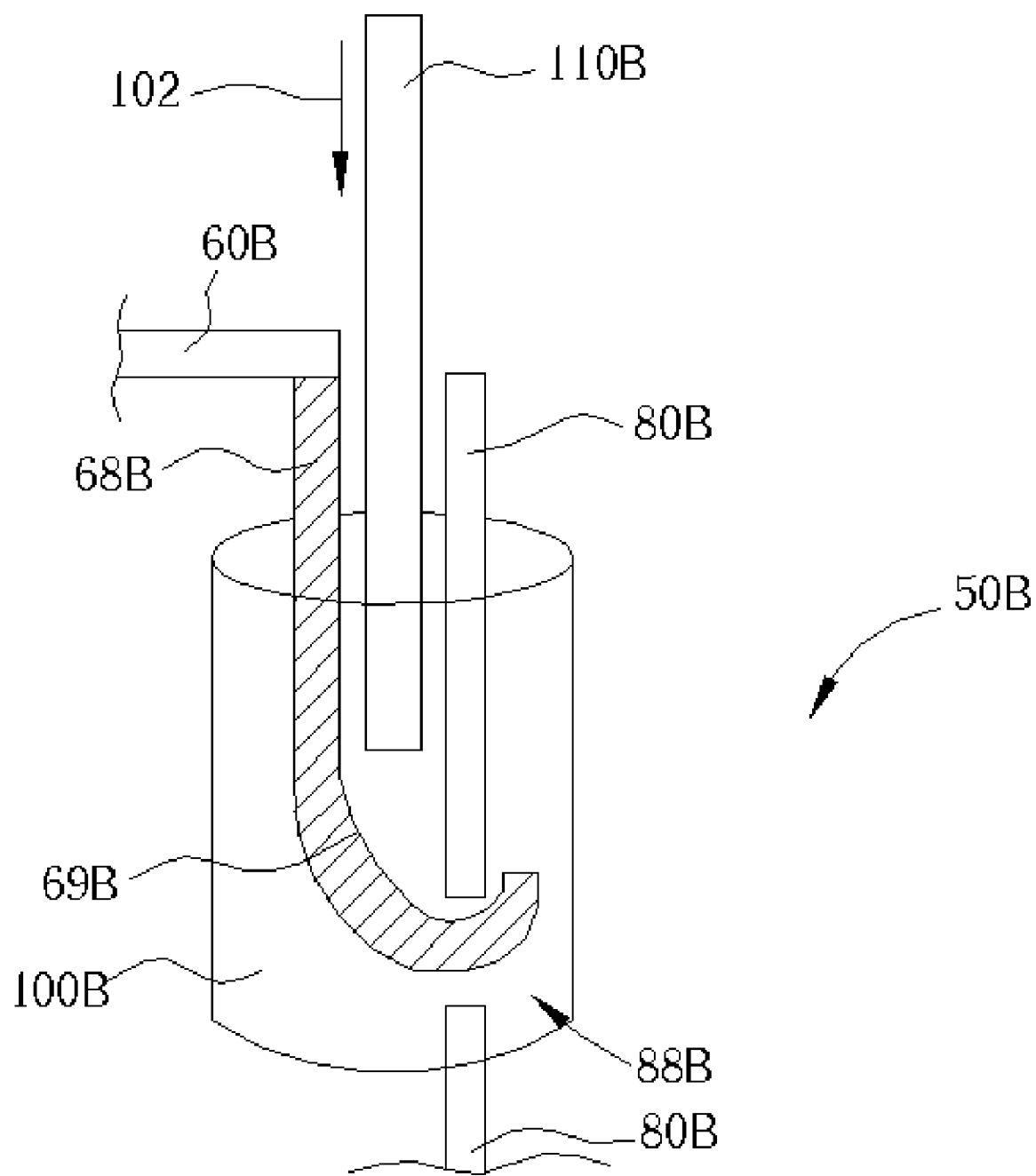
FIG. 9 is a partial view of a third embodiment optical disc drive.

Please refer to FIG. 9. FIG. 9 is a partial view of a third embodiment optical disc drive 50B. The third embodiment optical disc drive 50B is similar to the second embodiment optical disc drive 50A shown in FIG. 8. The only difference is hooks 68B have a slightly different shape, allowing sticks 110B to be inserted between the hooks 68B and a lower housing 80B. A bottom section of the hooks 68B contain an angled section 69B for causing the hooks 68B to move out of the openings 88B as the sticks 110B are inserted in the downward direction 102.

Figure 10:
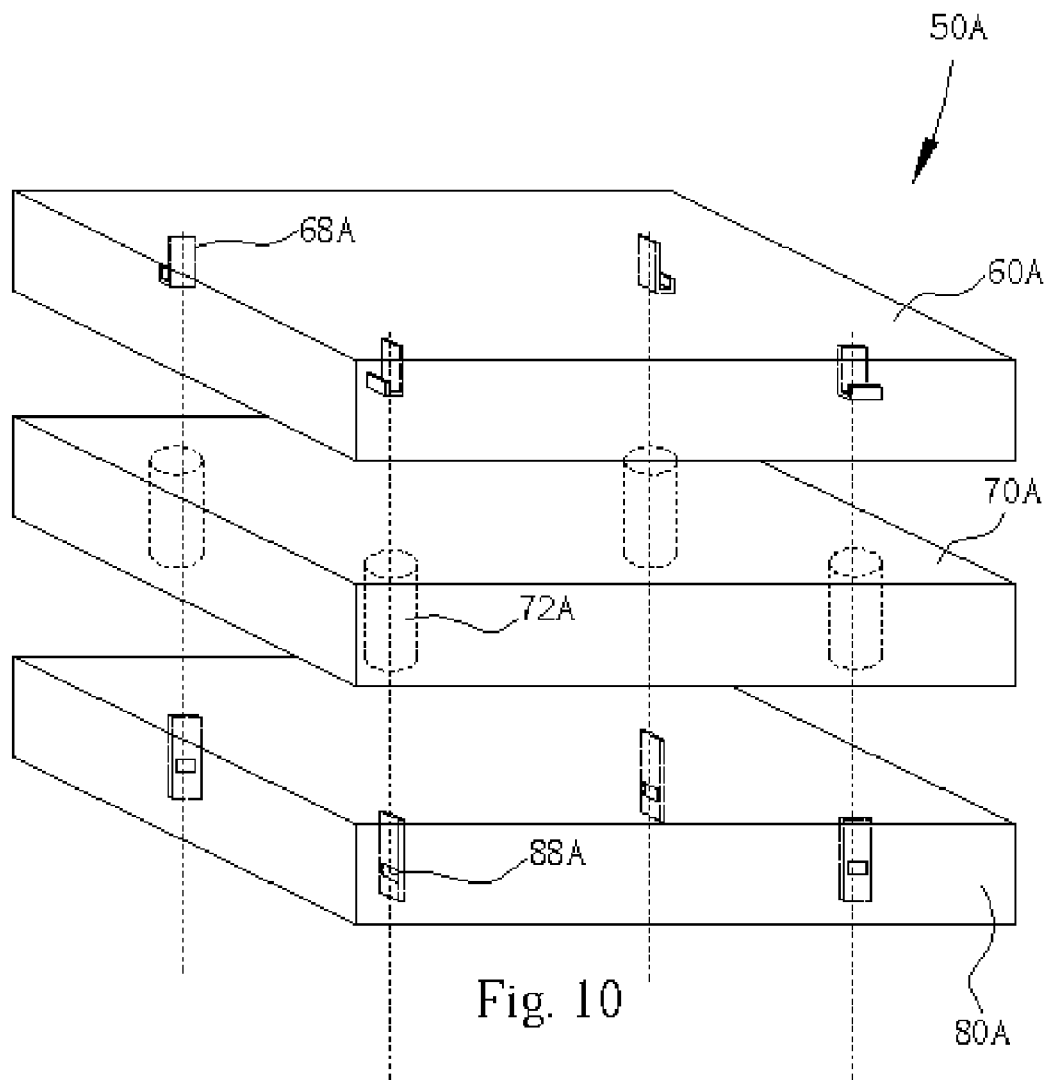
FIG. 10 is an exploded view of the second embodiment optical disc drive.

Please refer to FIG. 10. FIG. 10 is an exploded view of the second embodiment optical disc drive 50A. As seen, the hooks 68A can be inserted into the guiding holes 72A of the loader 70A for latching with the openings 88A that are also inserted into the guiding holes 72A. Thus, the guiding holes 72A are used for receiving the hooks 68A and the openings 88A, and are not used for receiving flaps. The hooks 68A and the openings 88A can replace the flaps by guiding the upper housing 60A onto the lower housing 80A during assembly.

Figure 11:
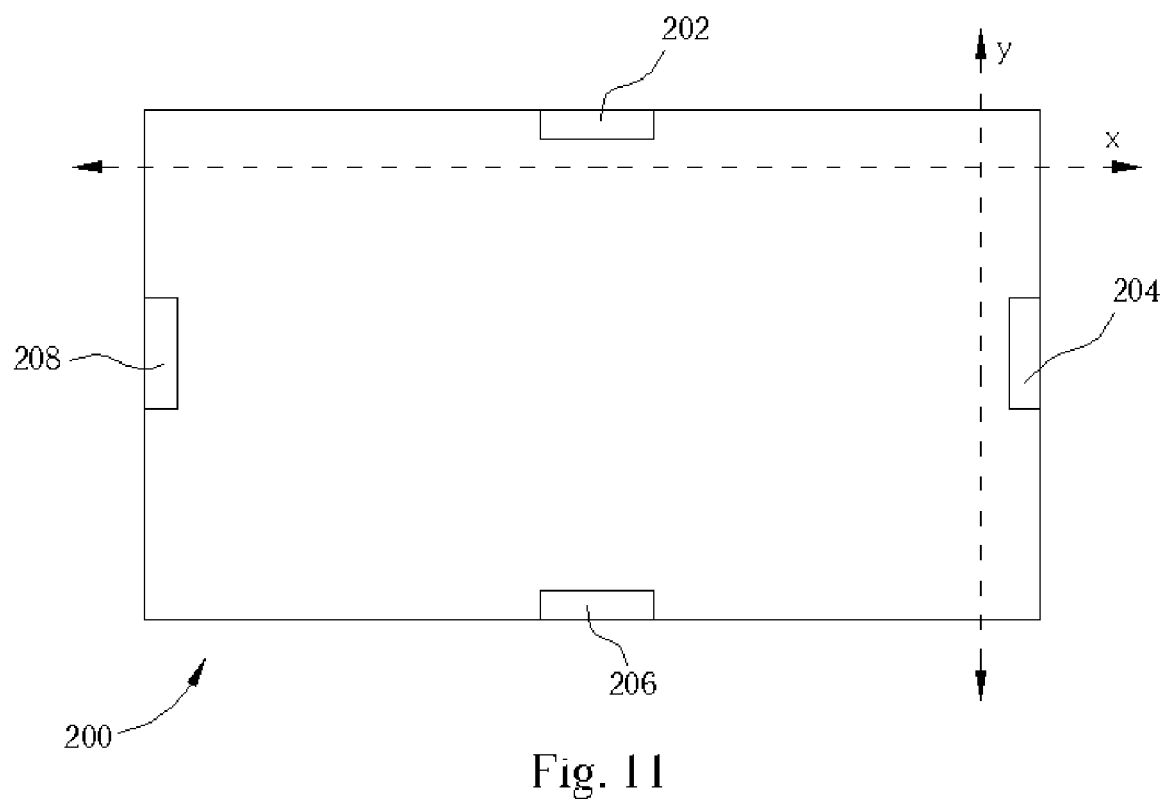
FIG. 11 is a diagram showing preferred placement of hooks on an optical disc drive according to the present invention.

When hooks of the upper housing are inserted into openings located on a wall of the lower housing, slight movement is still possible in the direction perpendicular to the wall of the lower housing. For an example, please refer to FIG. 11. FIG. 11 is a diagram showing preferred placement of hooks 202, 204, 206, and 208 on an optical disc drive 200 according to the present invention. For stopping relative movement of the upper and lower housings, either hook 202 or 206 can be used to stop motion in the y-direction. Similarly, either hook 204 or 208 can be used to stop motion in the x-direction. Therefore, it is recommended to include at least two hooks with the optical disc drive 200. For the most protection against motion, it is recommended that at least one hook be placed on each side of the optical disc drive 200, as illustrated by the four hooks 202, 204, 206, and 208 shown in FIG. 11. Similarly, the four hooks 68A shown in FIG. 10 are all positioned in four different directions, for limiting the movement of the upper housing 60A with respect to the lower housing 80A.

Compared to the prior art optical disc drive, the present invention optical disc drive does not require the use of screws for securing the upper and lower housings to each other. The upper and lower guiding flaps ensure that the lower and upper housings are placed in the proper position, so that the hooks in the upper housing and the openings in the lower housing can be aligned correctly. The use of hooks and openings instead of using screws allow the present invention optical disc drive to be assembled and disassembled quickly for reducing the time and cost required for assembly and disassembly. The present invention is not limited to use in an optical disc drive, and can be used in any electronic device that contains an upper housing, a lower housing, and a plastic housing located between the upper and lower housings.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An optical disc drive comprising:
   a lower housing comprising:
   a plurality of lower guiding flaps for guiding the lower housing into proper position during assembly; and
   a plurality of openings formed in the lower housing;
   a loader for reading an optical disc, the loader being disposed on the lower housing, the loader comprising a plurality of guiding holes for receiving the corresponding lower guiding flaps as the loader is disposed on the lower housing; and an upper housing disposed on the lower housing for enclosing the loader between the upper housing and the lower housing, the upper housing comprising:

a plurality of upper guiding flaps formed for insertion into the corresponding guiding holes of the loader for guiding the upper housing into proper position during assembly; and a plurality of hooks formed for insertion into the corresponding openings of the lower housing for securing the upper housing to the lower housing.

2. The optical disc drive of claim 1 wherein each of the lower guiding flaps is monolithically formed with the lower housing by cutting a pattern in the lower housing and folding the lower guiding flaps inward, leaving an exposed hole on a bottom surface of the lower housing.

3. The optical disc drive of claim 1 wherein each of the upper guiding flaps is monolithically formed with the upper housing by cutting a pattern in the upper housing and folding the upper guiding flaps inward, leaving an exposed hole on a top surface of the upper housing.

4. The optical disc drive of claim 1 wherein the openings are formed in side surfaces of the lower housing.

5. The optical disc drive of claim 4 wherein the hooks are formed on side surfaces of the upper housing corresponding to the openings of the lower housing.

6. The optical disc drive of claim 5 wherein each of the hooks is capable of being released from the corresponding opening by pushing the hook toward the opening in a direction perpendicular to the side surface of the lower housing.

7. The optical disc drive of claim 1 wherein the openings are formed above a bottom surface of the lower housing, the hooks are formed below a top surface of the upper housing corresponding to the openings of the lower housing, and the loader comprises a plurality of tunneling holes through which the hooks insert into the corresponding openings.

8. The optical disc drive of claim 7 wherein each of the hooks is capable of being released from the corresponding opening by pushing the hook downward.

9. The optical disc drive of claim 1 wherein the openings are formed above a bottom surface of the lower housing, the hooks are formed below a top surface of the upper housing corresponding to the openings of the lower housing, and the hooks insert into the corresponding openings through the guiding holes of the loader.

10. The optical disc drive of claim 1 wherein the openings have a rectangular shape.

11. The optical disc drive of claim 1 wherein a cross-sectional area of the hooks has a J-shape.

12. An electrical device comprising:
a lower housing comprising:
a plurality of lower guiding flaps for guiding the lower housing into proper position during assembly; and
a plurality of openings formed in the lower housing;
a plastic housing disposed on the lower housing, the plastic housing comprising a plurality of guiding holes for receiving the corresponding lower guiding flaps as the plastic housing is disposed on the lower housing; and an upper housing disposed on the lower housing for enclosing the plastic housing between the upper housing and the lower housing, the upper housing comprising:

a plurality of upper guiding flaps formed for insertion into the corresponding guiding holes of the plastic housing for guiding the upper housing into proper position during assembly; and a plurality of hooks formed for insertion into the corresponding openings of the lower housing for securing the upper housing to the lower housing.

13. The electrical device of claim 12 wherein each of the lower guiding flaps is monolithically formed with the lower housing by cutting a pattern in the lower housing and folding the lower guiding flaps inward, leaving an exposed hole on a bottom surface of the lower housing, and each of the upper guiding flaps is monolithically formed with the upper housing by cutting a pattern in the upper housing and folding the upper guiding flaps inward, leaving an exposed hole on a top surface of the upper housing.

14. The electrical device of claim 12 wherein the openings are formed in side surfaces of the lower housing, and the hooks are formed on side surfaces of the upper housing corresponding to the openings of the lower housing.

15. The electrical device of claim 14 wherein each of the hooks is capable of being released from the corresponding opening by pushing the hook toward the opening in a direction perpendicular to the side surface of the lower housing.

16. The electrical device of claim 12 wherein the openings are formed above a bottom surface of the lower housing, the hooks are formed below a top surface of the upper housing corresponding to the openings of the lower housing, and the plastic housing comprises a plurality of tunneling holes through which the hooks insert into the corresponding openings.

17. The electrical device of claim 16 wherein each of the hooks is capable of being released from the corresponding opening by pushing the hook downward.

18. The electrical device of claim 12 wherein the openings are formed above a bottom surface of the lower housing, the hooks are formed below a top surface of the upper housing corresponding to the openings of the lower housing, and the hooks insert into the corresponding openings through the guiding holes of the plastic housing.

19. The electrical device of claim 12 wherein the openings have a rectangular shape and a cross-sectional area of the hooks has a J-shape.

20. The electrical device of claim 12 being an optical disc drive.

\* \* \* \* \*